(12) United States Patent
Yamamoto et al.

(10) Patent No.: US 7,274,354 B2
(45) Date of Patent: Sep. 25, 2007

(54) PORTABLE ELECTRONIC APPARATUS

(75) Inventors: Tamotsu Yamamoto, Ashiya (JP); Kenichi Kagami, Yokohama (JP); Toyoshi Fukumura, Maizuru (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 384 days.

(21) Appl. No.: 10/344,670

(22) PCT Filed: May 23, 2002

(86) PCT No.: PCT/JP02/05012

§ 371 (c)(1), (2), (4) Date: Oct. 7, 2003

(87) PCT Pub. No.: WO02/095564

PCT Pub. Date: Nov. 28, 2002

(65) Prior Publication Data

US 2004/0051695 A1    Mar. 18, 2004

(30) Foreign Application Priority Data

May 24, 2001    (JP) ............................. 2001-154959

(51) Int. Cl.
*G09G 5/08*    (2006.01)
(52) U.S. Cl. ...................... 345/157; 345/161; 345/162; 345/163; 345/168; 345/169
(58) Field of Classification Search ................ 345/157, 345/161–163, 168–169
See application file for complete search history.

(56) References Cited

U.S. PATENT DOCUMENTS 5,563,631 A * 10/1996 Masunaga ............... 345/169
5,615,384 A * 3/1997 Allard et al. .............. 715/800
6,556,222 B1 * 4/2003 Narayanaswami ......... 715/786
6,774,890 B2 * 8/2004 Engholm .................. 345/173
7,039,866 B1 * 5/2006 Rosenberg et al. ........ 715/701
2005/0093824 A1 * 5/2005 Hinckley et al. .......... 345/163

FOREIGN PATENT DOCUMENTS

| JP | 1-293423 |   | 11/1989 |
| JP | 01-293423 | * | 11/1989 |
| JP | 1-293423 A |   | 11/1989 |
| JP | 09-220201 |   | 8/1997 |
| JP | 10-320115 |   | 12/1998 |
| JP | 10-320115 A |   | 12/1998 |
| JP | 11-126126 |   | 5/1999 |
| JP | 11-126126 A |   | 5/1999 |
| JP | 11-299782 |   | 11/1999 |
| JP | 11-299782 A |   | 11/1999 |
| JP | 2001-016635 |   | 1/2001 |

* cited by examiner

*Primary Examiner*—Richard Hjerpe
*Assistant Examiner*—Leonid Shapiro
(74) *Attorney, Agent, or Firm*—McDermott Will & Emery LLP

(57) ABSTRACT

A portable electronic apparatus disclosed has excellent operability, being capable of zooming, scrolling, moving a cursor, selecting an icon and others with one small operation unit. This portable electronic apparatus includes a display unit, the operation unit and a controller. The display unit displays information received or stored. The one operation unit is used for operations including moving of a pointer displayed on the display unit, the zooming and the scrolling of the information displayed on the display unit, the moving of the cursor and the selection of the icon. The controller executes the operations in response to operation of the operation unit.

9 Claims, 25 Drawing Sheets

PORTABLE ELECTRONIC APPARATUS

TECHNICAL FIELD

The present invention relates to a portable electronic apparatus, which facilitates control or operation, such as zooming on displayed information, scrolling, moving of a cursor or selection of an icon.

BACKGROUND ART

With widespread use of the Internet, content described in a structural description language such as Hyper Text Markup Language (HTML) used by the World Wide Web (WWW) has enjoyed a rapid distribution in recent years.

The content mentioned here refers to multimedia data including text, an image and sound. The content described in a structural description language such as HTML (hereinafter referred to simply as "HTML content") is distributed, for example, in the following manner.

A personal computer or the like which is connected to a network such as the Internet specifies an Uniform Resource Locator (URL) having desired HTML content and sends a request to the network. A server corresponding to this URL obtains the HTML content specified by the personal computer from a database. The server then sends the HTML content thus obtained to the personal computer across the network. The personal computer receives this HTML content across the network, analyzes a tag or the like in the HTML content received and displays an image on its specified display unit based on a result of this analysis.

Recently, not only the personal computer but also a portable electronic apparatus functioning as a communication terminal for a portable telephone or a Personal Handyphone System (PHS) or the like receives the content described in the structural description language through a network such as a portable telephone network. The portable electronic apparatuses display the image or the like by using the content received.

Referring to the accompanying drawings, a description is hereinafter provided of an example of a conventional display of the image on the portable electronic apparatus, which functions as the communication terminal such as the portable telephone or the PHS, by use of the content received thorough the network.

FIGS. 27-41 illustrate a map search using the communication terminal.

In FIGS. 27-40, body 1 of the apparatus includes display unit 2, numeric keypad 3 and confirmation key 4. Up arrow key 5 is disposed above confirmation key 4, while down arrow key 6 is disposed below confirmation key 4. Right arrow key 7 is disposed on the right of confirmation key 4, while left arrow key 8 is disposed on the left of confirmation key 4.

The following description refers to a case where the content received across the network is utilized by such a structure.

This description refers to the search for a map including a station and its vicinity through use of an "i-mode" service provided by NTT DoCoMo as an example of an information providing service utilizing the portable telephone terminal and the Internet.

When apparatus body 1 is powered on, a main menu screen such as shown in FIG. 27(b) is displayed on display unit 2 of FIG. 27(a).

With the main menu screen displayed, up arrow key 5 is operated to select an "i-mode" icon.

Up arrow key 5 hatched in FIG. 27(a) indicates that this key 5 is in operation.

Some of the following drawings too have hatched keys to show that those keys are in operation.

Confirmation key 4 is operated as shown in FIG. 28(a) to confirm the selection of the "i-mode" icon shown in FIG. 28(b).

This confirmation effects display of an "i-mode" menu screen on display unit 2 as shown in FIG. 29(b). As down arrow key 6 is operated as shown in FIG. 29(a), cursor 9 appearing on this menu screen moves accordingly. Here, the cursor is moved to select the sixth menu option, "Map", as shown in FIG. 30(b). When cursor 9 is positioned over "Map" in the menu, confirmation key 4 is operated as shown in FIG. 30(a) to confirm the selection of "Map" from the menu.

As the selection from the menu is confirmed, a "Select Area" screen is displayed as shown in FIG. 31(b). Options "1"-"9" on this screen include respective area names in Japan.

Next, down arrow key 6 is operated as shown in FIG. 31(a) to move cursor 9. Here, the Kansai area is selected as shown in FIG. 32(b). Confirmation key 4 is thereafter operated as shown in FIG. 32(a) to confirm the selection of the Kansai area.

As the selection of the Kansai area is confirmed, a "Select Search Method" screen is displayed as shown in FIG. 33(b).

Subsequently, down arrow key 6 is operated as shown in FIG. 33(a) to move cursor 9, and "Search by Station Name" is selected with cursor 9, as shown in FIG. 34(b).

Confirmation key 4 is then operated as shown in FIG. 34(b), whereby the screen changes to an "Edit" screen shown in FIG. 35(b).

Confirmation key 4 is again operated as shown in FIG. 35(a), whereby the "Edit" screen becomes available.

Numeric keypad 3 is thereafter operated to input "Nishi Sanso" on this "Edit" screen as shown in FIG. 36(b).

"Nishi Sanso" is the name of a station in Kadoma city of Osaka Prefecture lying in the Kansai area of Japan.

As shown in FIG. 36(a), the input of this station name is confirmed with confirmation key 4.

Upon this confirmation, the "Select Search Method" screen including input "Nishi Sanso" is displayed as shown in FIG. 37(b). Here, cursor 9 is positioned at "Search". When confirmation key 4 is operated as shown in FIG. 37(a), a map showing "Nishi Sanso" and its surroundings is displayed as shown in FIG. 38(b).

This map can be scrolled with "1"-"4" keys and "6"-"9" keys of numeric keypad 3 shown in FIG. 38(a). With a "5" key, a zoom in can be done. With a "0" key, a zoom out can be done. When the "5" key is operated as shown in FIG. 38(a), a zoomed-in map is displayed as shown in FIG. 39(b).

Next, the "1" key of numeric keypad 3 is operated as shown in FIG. 39(a) to scroll the zoomed-in map in an upper-left direction, whereby a map shown in FIG. 40(b) is displayed. After the map is confirmed, down arrow key 6 is operated as shown in FIG. 40(a) to move cursor 9 over "Top Menu". Confirmation key 4 is then operated as shown in FIG. 40(c). Then the screen returns to the top menu screen shown in FIG. 41.

As described above, the conventional portable electronic apparatus requires, besides the numeric keypad, at least five keys including confirmation key 4, up arrow key 5, down arrow key 6, right arrow key 7 and left arrow key 8. These keys take up a lot of space in the small portable electronic apparatus. In addition, numeric keypad 3 is used to input commands including the scroll, the zoom in and the zoom out.

Accordingly, a user may need to memorize respective functions of the keys. Moreover, these keys increase finger motion of the user for operation. For this reason, the user may avert his/her eyes from the display screen for every input.

DISCLOSURE OF THE INVENTION

The present invention aims to provide a portable electronic apparatus having excellent operability. This portable electronic apparatus is capable of many operations, including zooming, scrolling, moving a cursor and selecting an icon, with one operation unit.

The portable electronic apparatus of this invention includes a display unit, the operation unit and a controller.

The display unit displays information received or stored.

The operation unit is used for those operations including moving of a pointer displayed on the display unit, the zooming and the scrolling of the information displayed on the display unit, the moving of the cursor and the selection of the icon.

In response to operation of the operation unit, the controller executes the operations.

BEST MODE FOR CARRYING OUT THE INVENTION

Exemplary embodiments of the present invention that include respective structures and operations are demonstrated hereinafter with reference to the accompanying drawings.

First Exemplary Embodiment

Referring to the accompanying drawings, a description is hereinafter provided of the first exemplary embodiment of the present invention.

Figure 1A:
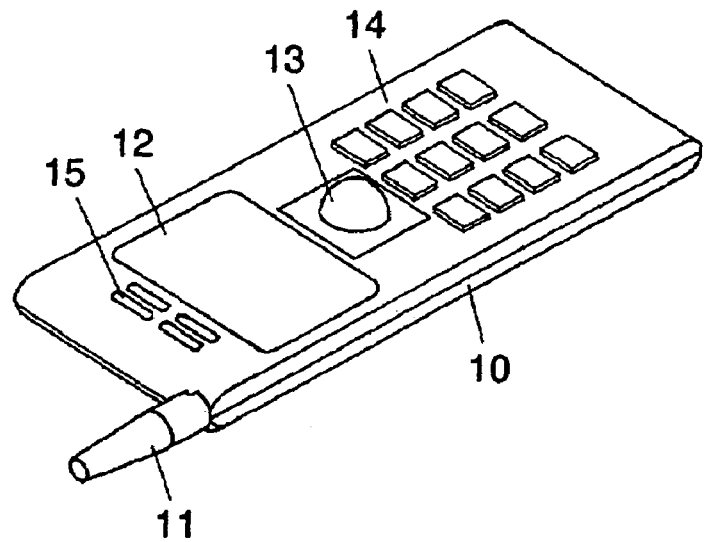
FIGS. 1(a) and 1(b) are a perspective view and a circuit block diagram of a portable electronic apparatus, respectively, in accordance with a first exemplary embodiment of the present invention.
Figure 1B:
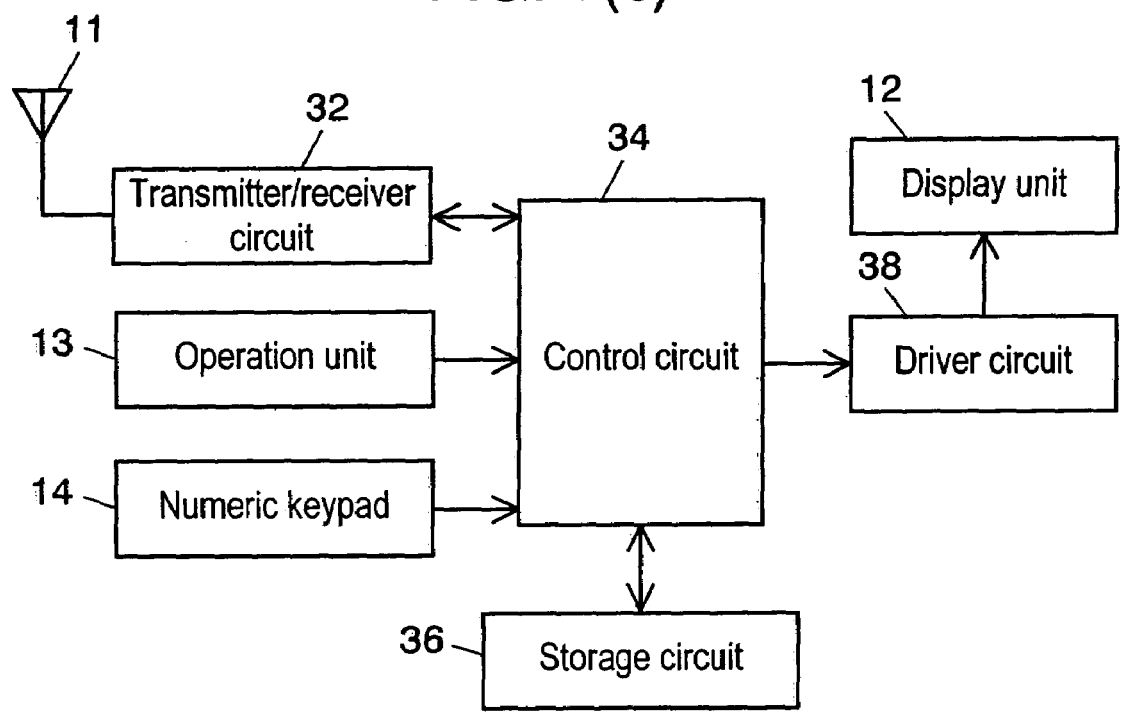

FIG. 1 is a perspective view of a portable telephone, which is a typical example of a portable electronic apparatus, in accordance with the first embodiment of the present invention.

Figure 2:
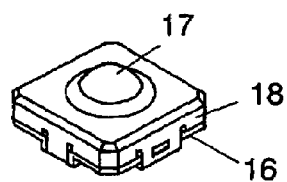
FIG. 2 is a perspective view of a trackball device that includes a push switch and functions as an operation unit mounted to the portable electronic apparatus in accordance with the first embodiment.

FIG. 2 is a perspective view of a trackball device that includes a push switch and functions as an operation unit mounted to the same portable electronic apparatus.

This trackball device including a push switch is a typical multidirectional input device including a push switch. The multidirectional input device mentioned here detects input operations corresponding to a plurality of directions, respectively.

In FIGS. 1 and 2, body 10 of the portable electronic apparatus includes antenna 11, display unit 12, operation unit 13, numeric keypad 14 and sound release hole 15.

Antenna 11 is provided at an upper end of apparatus body 10. Display unit 12 is formed of a liquid crystal display or the like and provided at a front surface of apparatus body 10. Operation unit 13 is provided in the vicinity of display unit 12 at the front surface of apparatus body 10. Numeric keypad 14 is used for inputting a number and a character. Sound release hole 15 is provided above display unit 12 and lets out a sound produced by a sounding member placed inside apparatus body 10.

Apparatus body 10 also includes required circuits including control circuit 34, storage circuit 36, a power circuit, and drive circuit 38 for display unit 12.

Control circuit 38 detects an input signal from transmitter/receiver circuit 32 and an input signal produced by operation of operation unit 13 or numeric keypad 14, and controls an output signal from transmitter/receiver circuit 32. Control circuit 34 also controls storage circuit 36, drive circuit 38 for display unit 12 and others.

The trackball device, for example, is employed as operation unit 13 mentioned above. This trackball device has, for example, the following structure including the push switch.

In the trackball device shown in FIG. 2, square case 16 is covered with cover 18 and the device houses ball 17 with an upper portion of ball 17 exposed.

In square case 16, the followings are disposed, for example, (1) four or five switches, or
(2) two encoders and one switch, or
(3) four Hall elements and one switch.

Case 16 also includes a control member for causing the switch, the encoder or the Hall element to operate as ball 17 is rolled.

In each of the above-mentioned cases (1)-(3), the controller detects the signal, which varies as ball 17 is rolled.

The trackball device may have any known structure other than any one of the structures described above.

In each of the above-mentioned cases, at least one switch is a push switch. This push switch is used for confirmation (described later) and is switched on or off when the ball is pressed.

Referring to the accompanying drawings, a description is hereinafter provided on how a map search is performed by the portable electronic apparatus having the structure described above through use of content received across a network.

This description refers to a case where an "i-mode" service provided by NTT DoCoMo is utilized as an example of an information provision service using the portable telephone terminal and the Internet.

FIGS. 3-17 illustrate input operations and display screens.

In these drawings, those hatched triangles 42 contacting track ball 17 each indicate a rolling direction of ball 17. Here, ball 17 is rolled toward a vertex of triangle 42 that is at the opposite angle to the side contacting with ball 17.

Figure 3A:
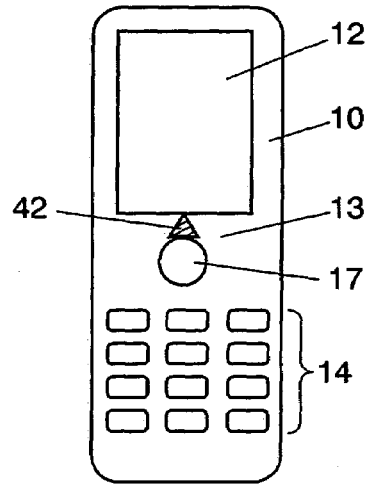
FIGS. 3(a) and 3(b) illustrate an input operation and a display screen of the portable electronic apparatus, respectively, in accordance with the first embodiment.
Figure 3B:
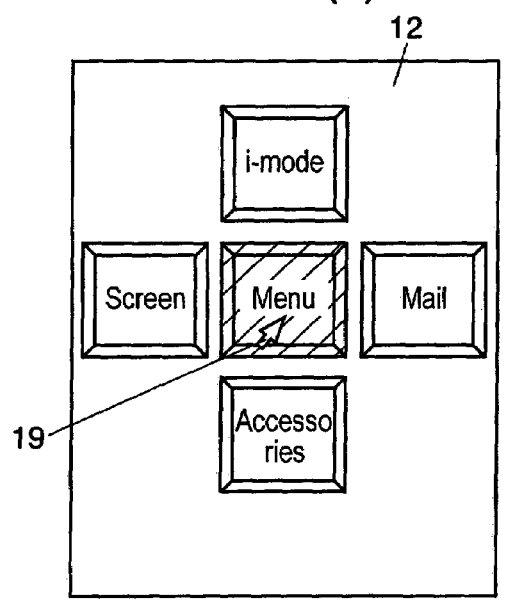

When apparatus body 10 is powered on, a main menu screen including pointer 19 is displayed on display unit 12, as shown in FIG. 3(b).

As ball 17 of operation unit 13 is rolled upward as indicated by triangle 42 in FIG. 3(a) with the main menu screen displayed, pointer 19 moves upward accordingly. Pointer 19 is thus placed on an "i-mode" icon as shown in FIG. 4(b).

Figure 4A:
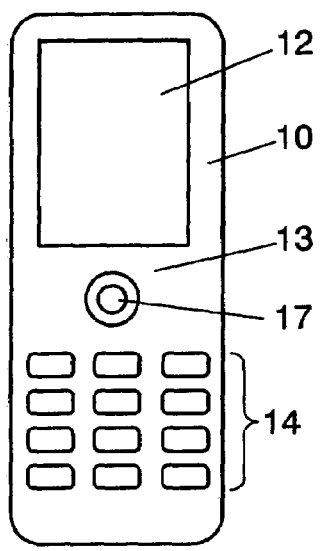
FIGS. 4(a) and 4(b) illustrate an input operation and a display screen, respectively, in accordance with the first embodiment.
Figure 4B:
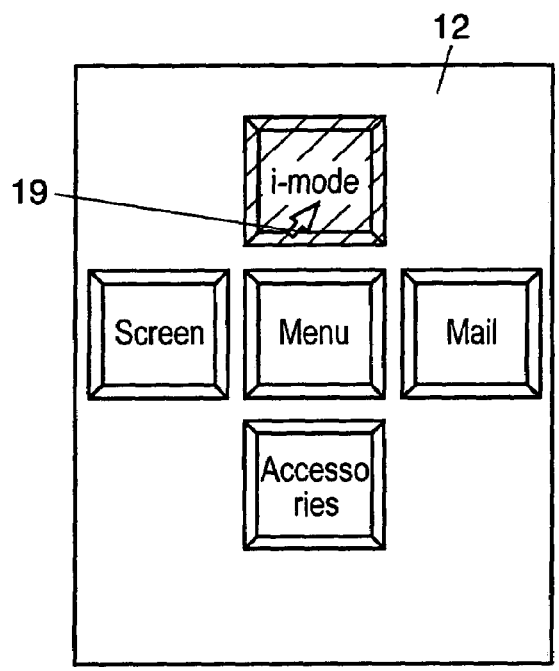

With pointer 19 placed on the "i-mode" icon, ball 17 of operation unit 13 is pressed as shown in FIG. 4(a) to confirm the selection of the "i-mode" icon.

Figure 5A:
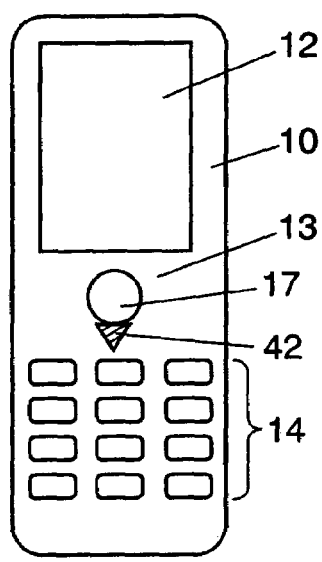
FIGS. 5(a) and 5(b) illustrate an input operation and a display screen, respectively, in accordance with the first embodiment.
Figure 5B:
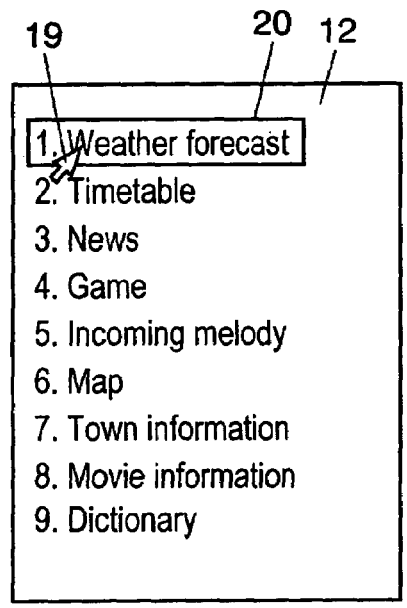

As the selection of the "i-mode" icon is confirmed, a menu screen is displayed as shown in FIG. 5(b). Here, pointer 19 and cursor 20 are located at "Weather Forecast", the first menu option from the top.

Figure 6A:
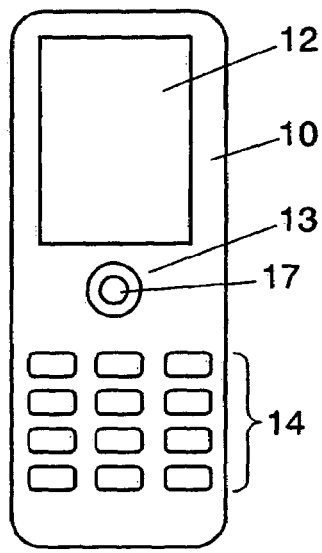
FIGS. 6(a) and 6(b) illustrate an input operation and a display screen, respectively, in accordance with the first embodiment.
Figure 6B:
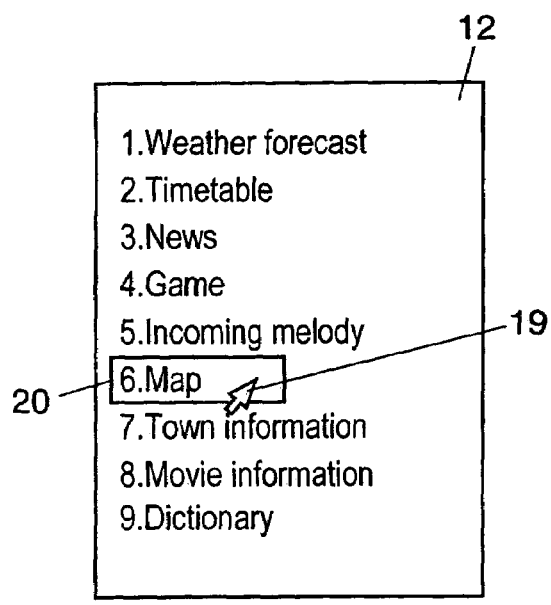

Ball 17 of operation unit 13 is thereafter rolled downward as indicated by triangle 42 in FIG. 5(a) to move pointer 19 downward. When pointer 19 is placed on a "Map" icon, which is menu option "6", as shown in FIG. 6(b), ball 17 is pressed as shown in FIG. 6(a) for confirmation. Here, cursor 20 too is located at "Map" selected.

Figure 7A:
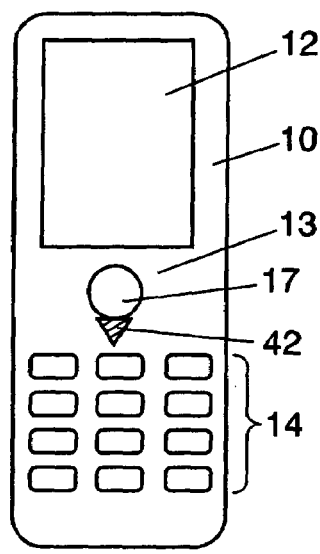
FIGS. 7(a) and 7(b) illustrate an input operation and a display screen, respectively, in accordance with the first embodiment.
Figure 7B:
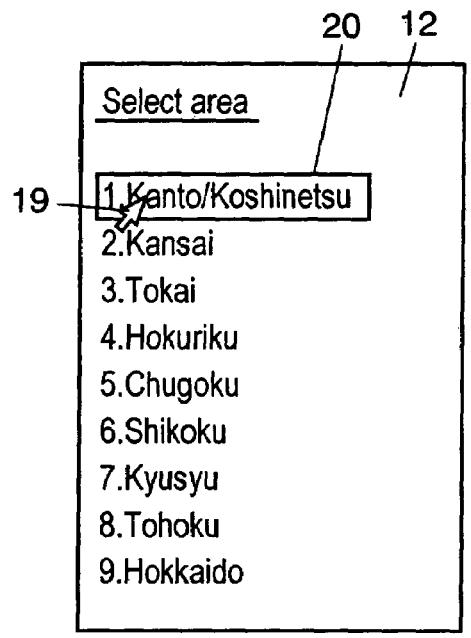

As "Map" is selected, a "Select an Area" screen is displayed as shown in FIG. 7(b). Options "1"-"9" displayed on this screen include respective area names in Japan.

Figure 8A:
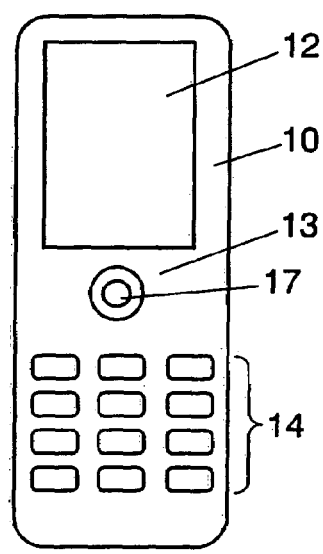
FIGS. 8(a) and 8(b) illustrate an input operation and a display screen, respectively, in accordance with the first embodiment.
Figure 8B:
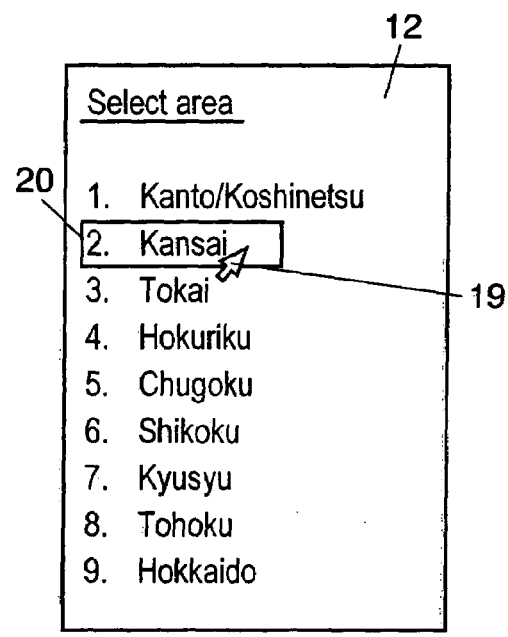

Here, ball 17 is rolled downward as indicated by triangle 42 in FIG. 7(a) to move pointer 19 to a "Kansai" icon, which is option "2". Subsequently, ball 17 is pressed as shown in FIG. 8(a), whereby the push switch (not shown) is switched on. Here, the controller executes this confirmation, whereby cursor 20 is placed at selected "Kansai" as shown in FIG. 8(b). In this way, the area is selected.

Figure 9A:
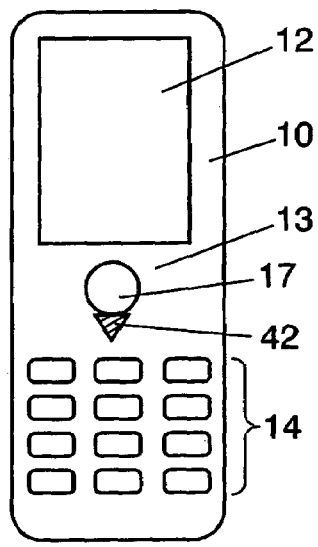
FIGS. 9(a) and 9(b) illustrate an input operation and a display screen, respectively, in accordance with the first embodiment.
Figure 9B:
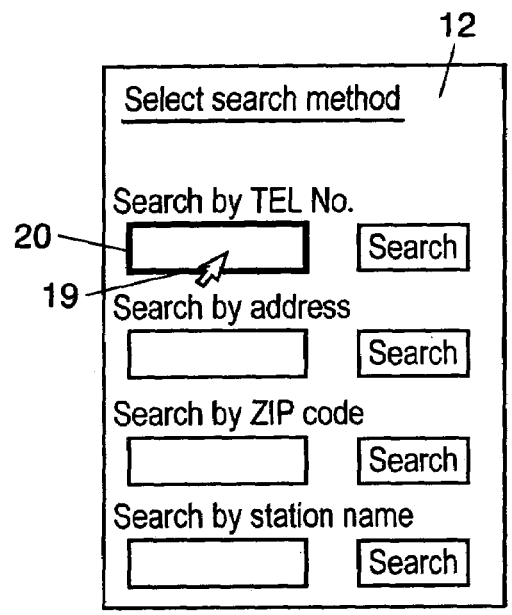
Figure 10A:
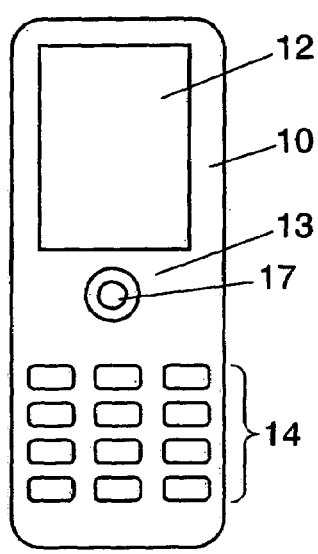
FIGS. 10(a) and 10(b) illustrate an input operation and a display screen, respectively, in accordance with the first embodiment.
Figure 10B:
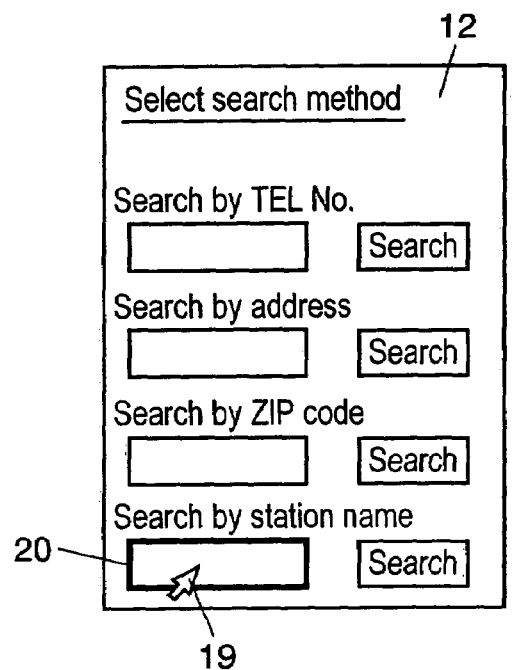

When the selection of the Kansai area is confirmed as described above, a "Select a Search Method" screen is displayed as shown in FIG. 9(b). Ball 17 is then rolled downward as indicated by triangle 42 in FIG. 9(a) to move pointer 19 to "Search by Station Name". Ball 17 is thereafter pressed as shown in FIG. 10(a), whereby cursor 20 is moved to "Search by Station Name" as shown in FIG. 10(b). In this way, "Search by Station Name" is selected, and this selection is confirmed.

Figure 11A:
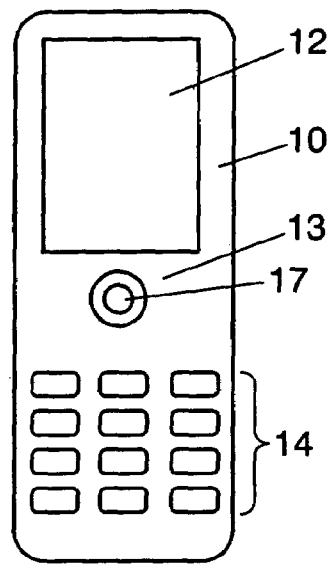
FIGS. 11(a) and 11(b) illustrate an input operation and a display screen, respectively, in accordance with the first embodiment.
Figure 11B:
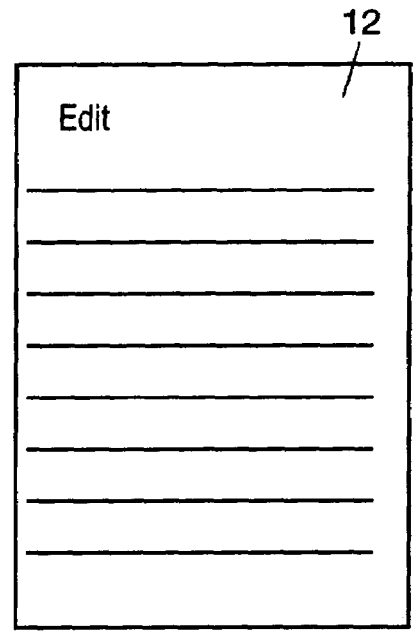

The above-described operation effects display of an "Edit" screen as shown in FIG. 11(b). Ball 17 is again pressed as shown in FIG. 11(a), whereby the "Edit" screen becomes available.

Figure 12A:
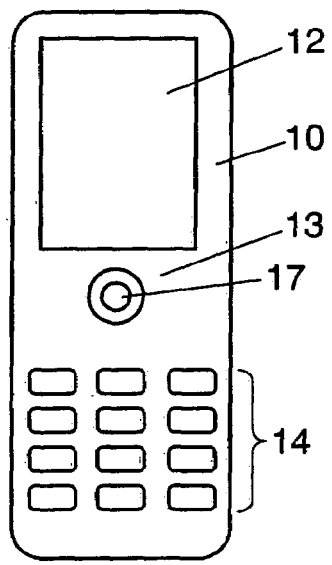
FIGS. 12(a) and 12(b) illustrate an input operation and a display screen, respectively, in accordance with the first embodiment.
Figure 12B:
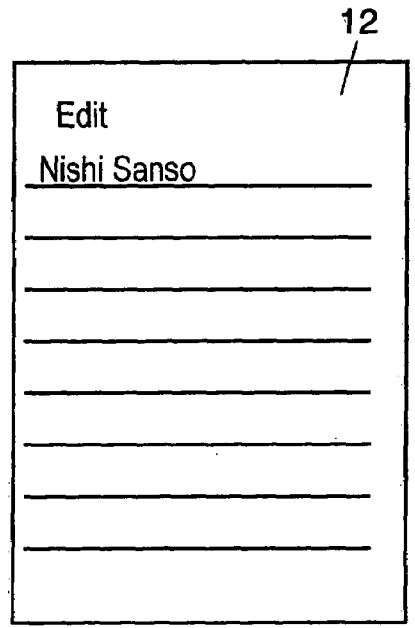

Subsequently, "Nishi Sanso", which is the name of a station, is input with numeric keypad 14 for display on the "Edit" screen as shown in FIG. 12(b). Thereafter, ball 17 is pressed as shown in FIG. 12(a) to confirm the input of "Nishi Sanso".

Figure 13A:
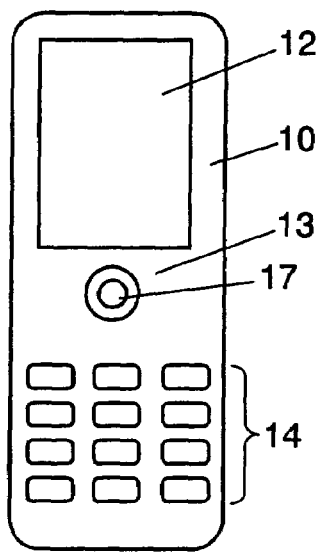
FIGS. 13(a) and 13(b) illustrate an input operation and a display screen, respectively, in accordance with the first embodiment.
Figure 13B:
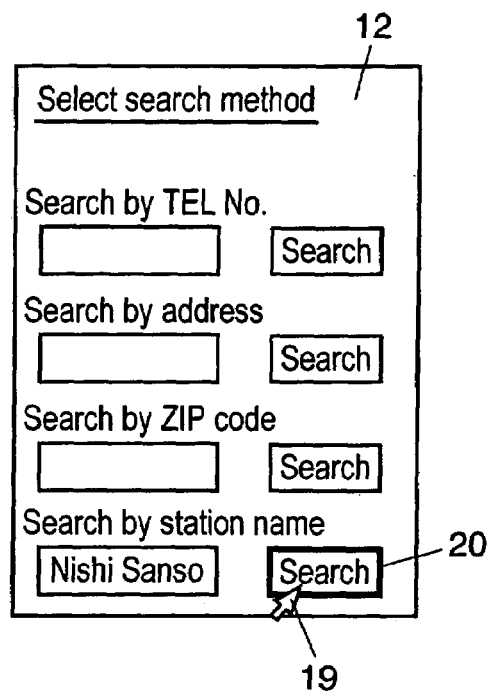

This confirmation effects display of the "Select a Search Method" screen including input "Nishi Sanso" as shown in FIG. 13(b). Pointer 19 is then placed on "Search" next to "Search by Station Name".

Figure 14A:
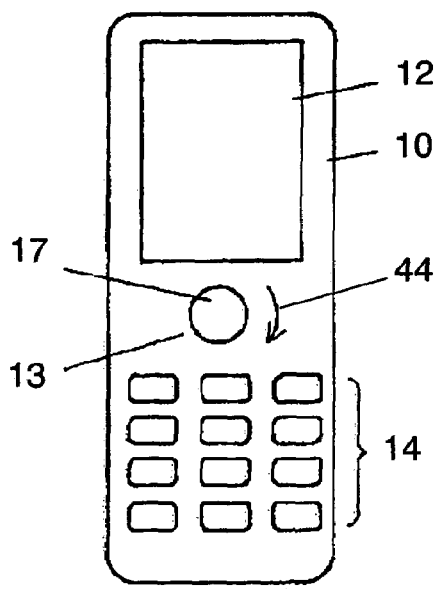
FIGS. 14(a) and 14(b) illustrate an input operation and a display screen, respectively, in accordance with the first embodiment.
Figure 14B:
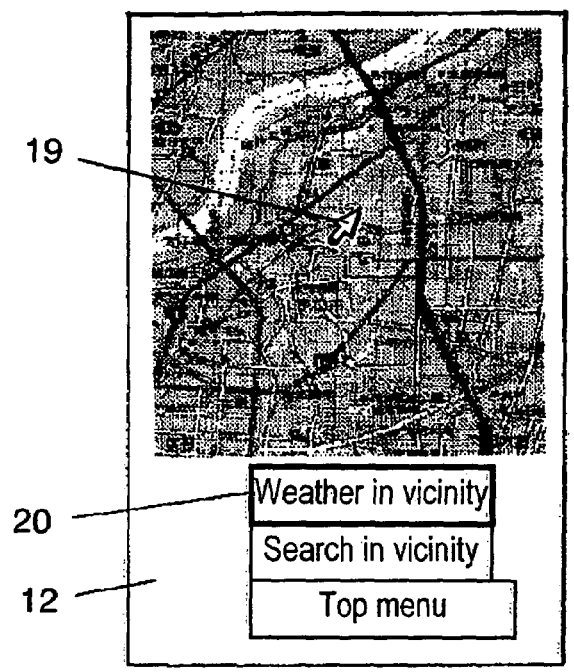

Thereafter, ball 17 is pressed as shown in FIG. 13(a) to confirm the "Search" for "Nishi Sanso", and consequently, a map showing Nishi Sanso station and its surroundings is displayed as shown in FIG. 14(b).

In cases where this map provides an unclear view because of its broad range, a zoomed-in display is obtained in the following manner.

(1) Pointer 19 is placed on a portion of the map that is to be magnified.

(2) Next, ball 17 is rolled clockwise along a plane as indicated by arrow 44 shown in FIG. 14(a).

Figure 15A:
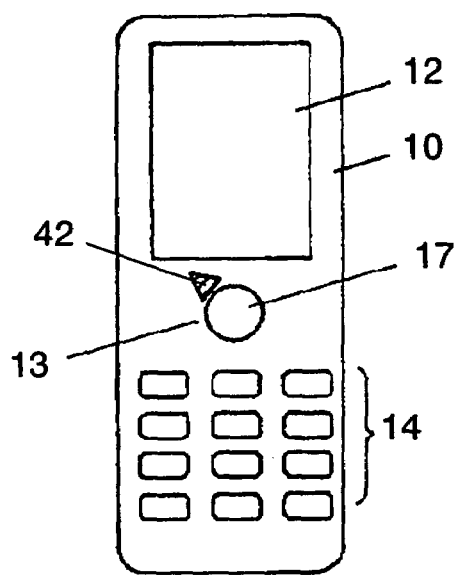
FIGS. 15(a) and 15(b) illustrate an input operation and a display screen, respectively, in accordance with the first embodiment.
Figure 15B:
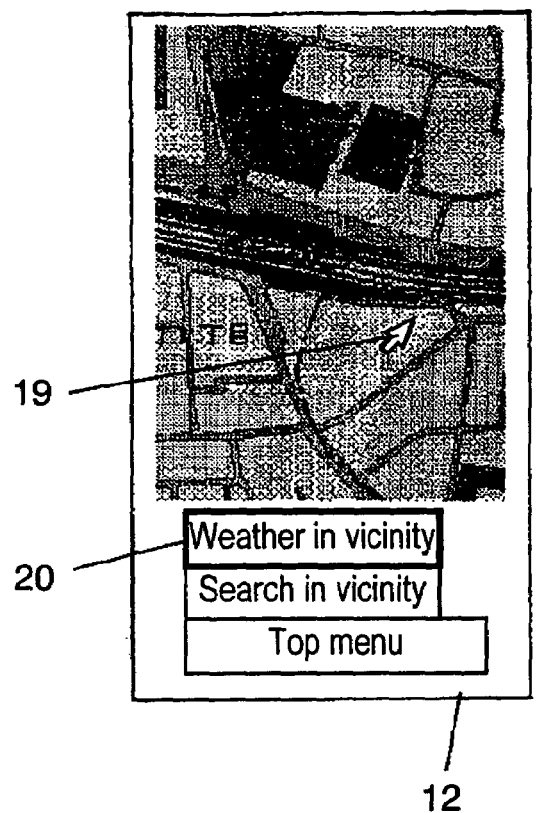

This operation effects display of the map's zoomed-in portion, which pointer 19 has pointed at, as shown in FIG. 15(b).

Conversely, rolling ball 17 counterclockwise along the plane effects display of a zoomed-out map.

It is to be noted that irrespective of the position of pointer 19, the zoom in may be performed on the center of the screen.

As described above, zooming is performed by rolling ball 17 of the trackball device along the plane. The portable electronic apparatus obtained is thus easy to operate.

Figure 16A:
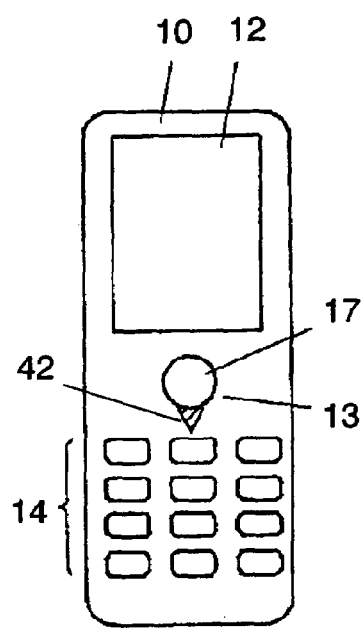
FIGS. 16(a)-16(c) illustrate input operations and a display screen in accordance with the first embodiment.
Figure 16B:
Figure 16C:
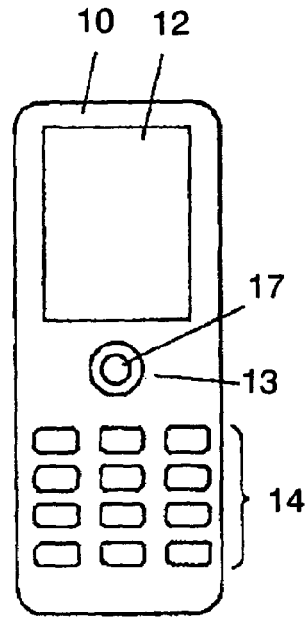
Figure 17:
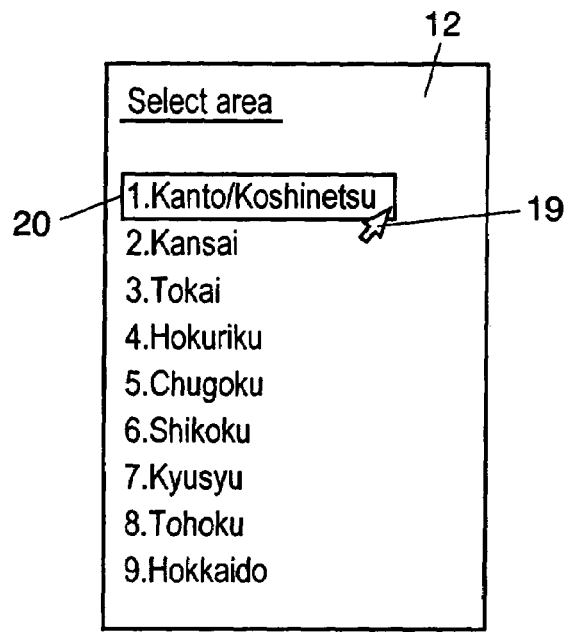
FIG. 17 illustrates a display screen in accordance with the first embodiment.

To scroll the zoomed-in map of FIG. 15(b), ball 17 is rolled in a direction indicated by triangle 42 shown in FIG. 15(a) toward a portion to be displayed, whereby the map's portion to be displayed is scrolled into view as shown in FIG. 16(b). Here, display unit 12 displays "Weather in Vicinity", "Search in Vicinity" and "Top Menu" below the map.

Next, ball 17 is rolled downward as indicated by triangle 42 in FIG. 16(a) to place pointer 19 on "Top Menu". Ball 17 is thereafter pressed, whereby cursor 20 is positioned at "Top Menu" for selection, and the selection of "Top Menu" is confirmed. Upon this confirmation, the display screen returns to the "Select an Area" screen shown in FIG. 17.

Figure 18A:
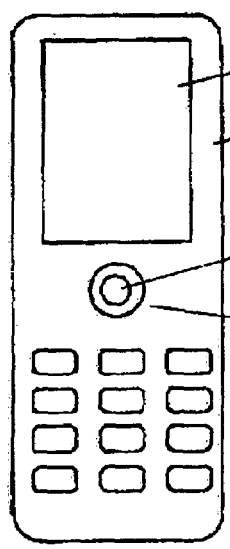
FIG. 18 illustrates an input operation and a display screen in accordance with the first embodiment.
Figure 18B:
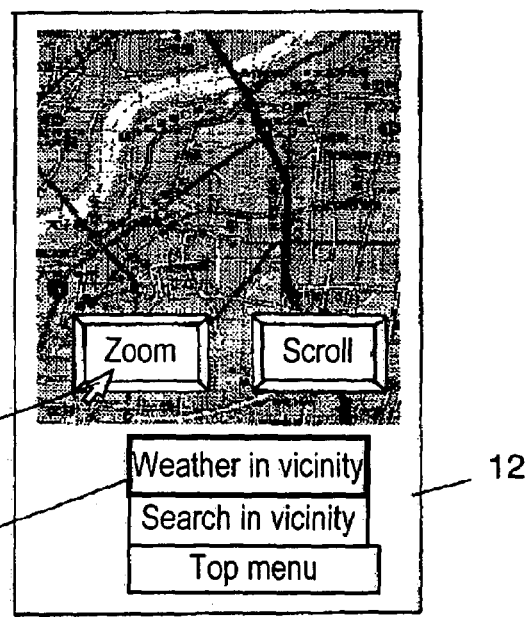

In a method different from the above-described method of operation, a screen, such as shown in FIG. 18(b), which includes "Zoom" and "Scroll" icons as well as the map, is displayed in place of the screen shown in FIG. 14(b). Here, pointer 19 is moved over "Zoom".

Thereafter, ball 17 is pressed as shown in FIG. 18(a) to confirm the selection of "Zoom". This effects display of zoom bar 21 representing "Zoom" on the right of display unit 12 as shown in FIG. 19(b). Pointer 19 is then moved over box 22 of this zoom bar 21.

Figure 19A:
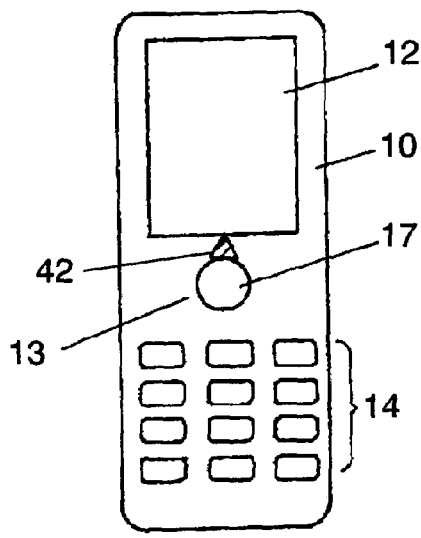
FIGS. 19(a) and 19(b) illustrate an input operation and a display screen, respectively, in accordance with the first embodiment.
Figure 19B:
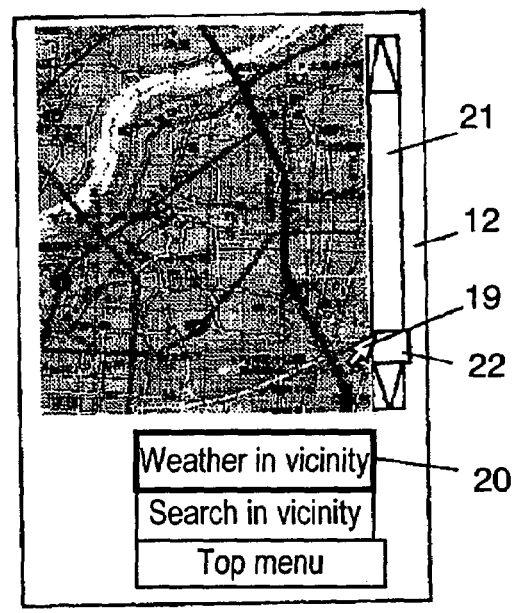

Next, ball 17 is rolled upward as indicated by triangle 42 in FIG. 19(a), whereby box 22 moves upward accordingly.

In this way, a zoom in is performed on the whole map. Display unit 12 thus displays a zoomed-in center portion of the map as shown in FIG. 20(b).

Figure 20A:
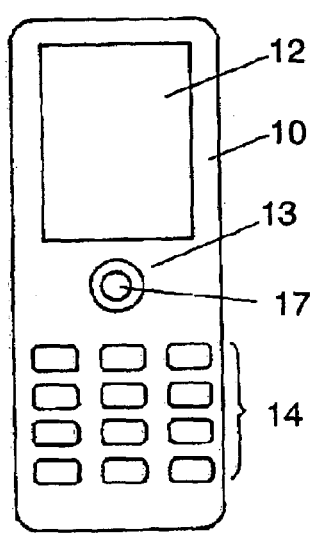
FIGS. 20(a) and 20(b) illustrate an input operation and a display screen, respectively, in accordance with the first embodiment.
Figure 20B:
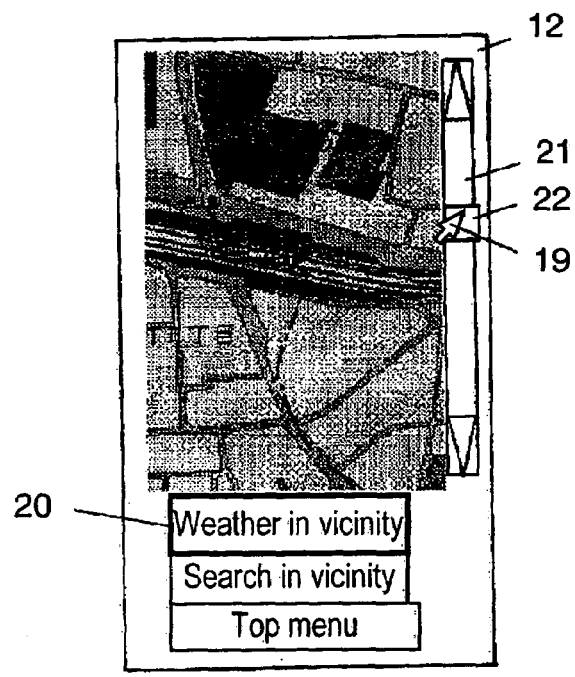

With the zoomed-in center portion displayed, ball 17 is pressed as shown in FIG. 20(a) for confirmation.

Figure 21A:
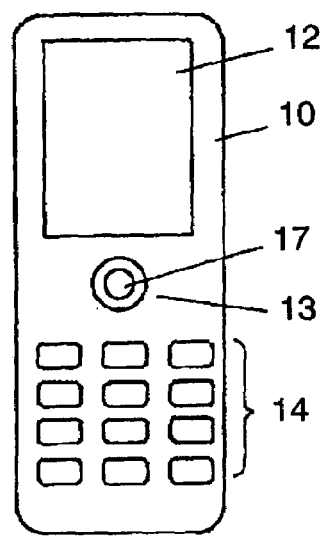
FIGS. 21(a) and 21(b) illustrate an input operation and a display screen, respectively, in accordance with the first embodiment.
Figure 21B:
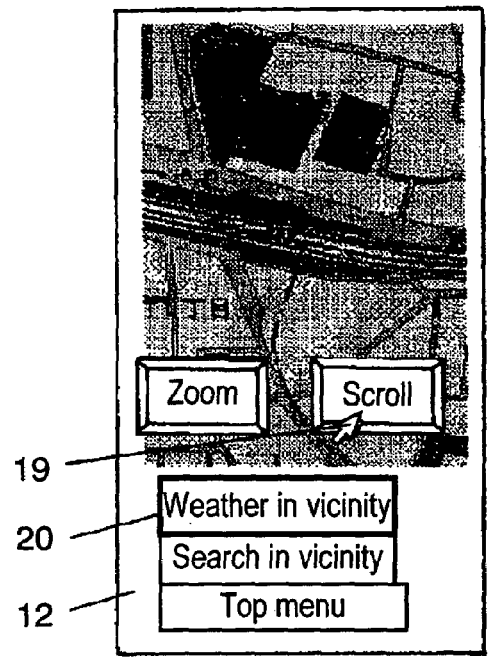
Figure 22A:
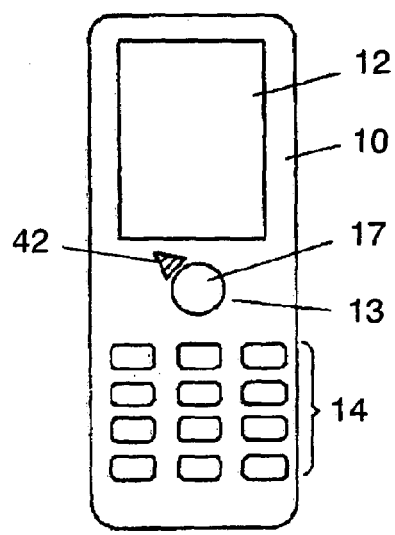
FIGS. 22(a) and 22(b) illustrate an input operation and a display screen, respectively, in accordance with the first embodiment.
Figure 22B:
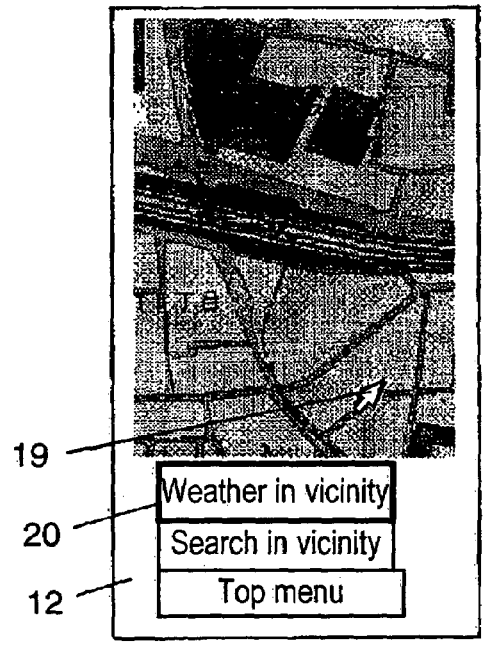

This confirmation effects display of the "Zoom" and "Scroll" icons on the zoomed-in map as shown in FIG. 21(b). Next, ball 17 is rolled to move pointer 19 over the "Scroll" icon. When ball 17 is thereafter pressed as shown in FIG. 21(a), the display screen includes pointer 19 on the zoomed-in map as shown in FIG. 22(b).

Subsequently, ball 17 is rolled in a direction indicated by triangle 42 in FIG. 22(a) to scroll the map in this direction. This effects display of a scrolled map as shown in FIG. 23(b). Here, the screen has the "Weather in Vicinity", "Search in Vicinity" and "Top Menu" icons displayed below the map.

Figure 23A:
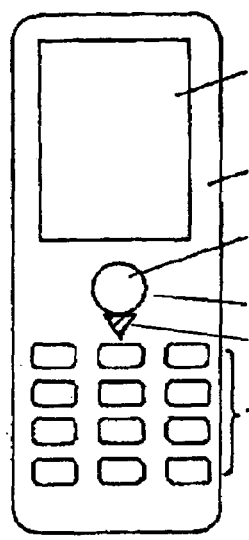
FIGS. 23(a)-23(c) illustrate input operations and a display screen in accordance with the first embodiment.
Figure 23B:

After the map is confirmed, ball 17 is rolled downward as indicated by triangle 42 in FIG. 23(a) to move pointer 19 over the "Top Menu" icon.

Figure 23C:
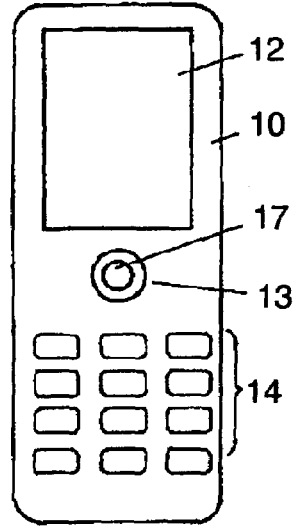
Figure 24:
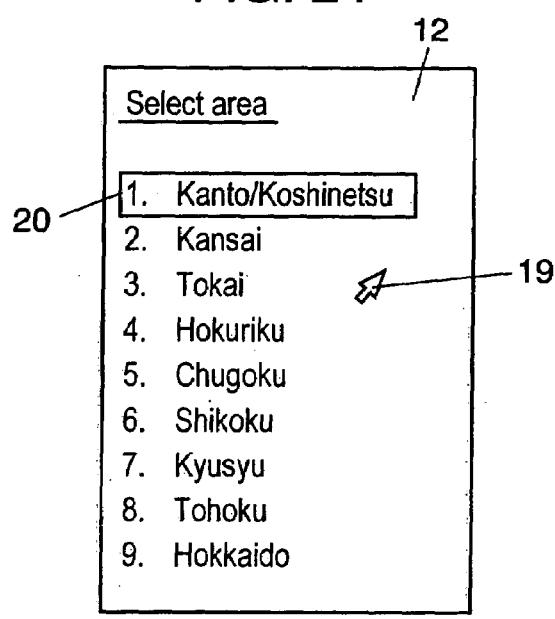
FIG. 24 illustrates a display screen in accordance with the first embodiment.

Ball 17 is thereafter pressed as shown in FIG. 23(c), whereby cursor 20 is located at "Top Menu" for selection, and the display screen returns to the top menu screen (i.e. the "Select Area" screen) shown in FIG. 24.

As is usually done, a scroll bar may be displayed at an end of the display screen, and the scroll may be performed on the displayed information by pointing the pointer at a scroll box of the scroll bar and moving the scroll box.

The first embodiment described above allows a user to perform many operations, including zooming, scrolling, moving the cursor, selecting the icon and confirming, with one operation unit 13. The apparatus obtained thus has excellent operability. Moreover, operation unit 13 mounted to apparatus body 10 requires reduced space for those operations.

Second Exemplary Embodiment

The second exemplary embodiment of the present invention is described hereinafter.

The present embodiment is basically similar to the first exemplary embodiment.

This embodiment differs from the first embodiment in that a multidirectional input device including a lever is employed as operation unit 13, and that an operation member is independently provided for displaying and erasing a pointer displayed on a display unit.

The multidirectional input device mentioned here detects input operations corresponding to a plurality of directions, respectively.

Figure 25:
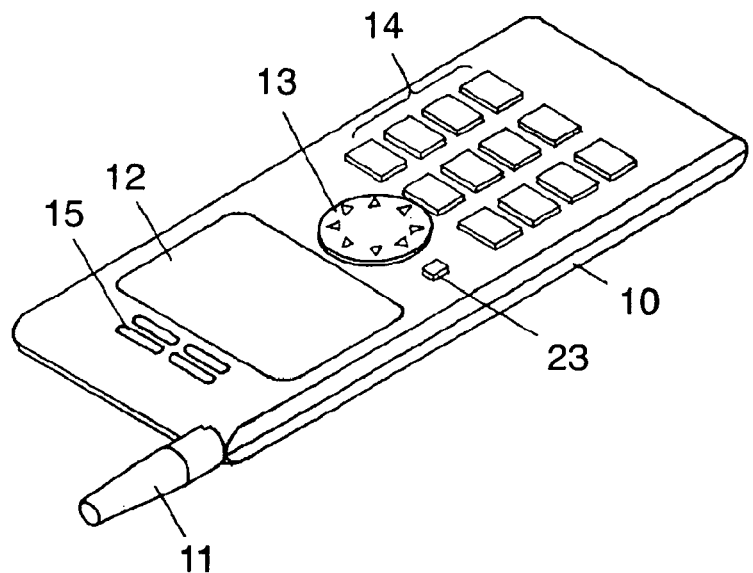
FIG. 25 is a perspective view of a portable electronic apparatus in accordance with a second exemplary embodiment of the present invention.

FIG. 25 is a perspective view of a portable electronic apparatus in accordance with the second embodiment of the present invention.

Figure 26A:
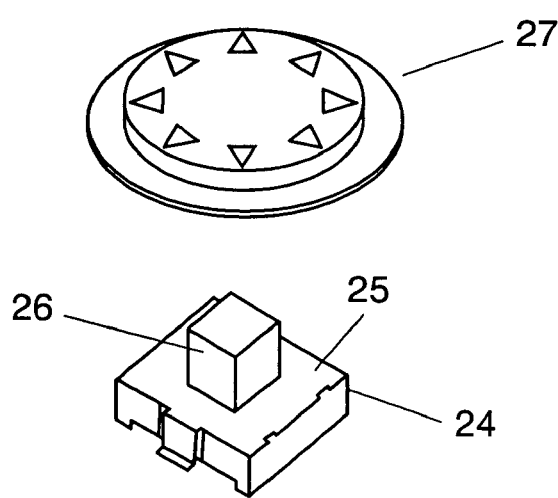
FIG. 26(a) is an exploded perspective view of an operation unit mounted to the portable electronic apparatus in accordance with the second embodiment.

FIG. 26(a) is an exploded perspective view of the multidirectional input device functioning as the operation unit mounted to the same portable electronic apparatus.

It is to be noted that elements similar to those in the first embodiment have the same reference marks, and the descriptions of those elements are omitted.

In FIGS. 25 and 26(a), operation member 23 is provided in the vicinity of operation unit 13 of apparatus body 10 to display and erase the pointer. A typical push switch can be used as operation member 23.

When operation member 23 is pressed with display unit 12 displaying pointer 19, pointer 19 is erased from a screen. When operation member 23 is pressed with the pointer erased, pointer 19 is displayed on the screen.

In other words, pointer 19 is displayed only when necessary for display, and pointer 19 is not displayed when unnecessary, so that the display screen can be simplified.

The multidirectional input device functioning as operation unit 13 has the following structure.

A displacement detecting element is disposed inside case 24. Cover 25, which covers this case 24, holds driving member 26 so that drive member 26 can be tilted. Driving member 26 is configured to control the displacement detecting element, thereby to obtain an output. This driving member 26 is coupled to knob 27.

Figure 26B:
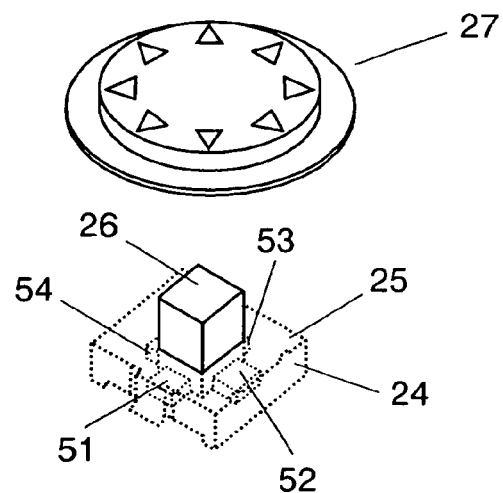
FIG. 26(b) is an exploded perspective view of the operation unit configured for detecting a change in pressure.

Here, as shown in FIG. 26(b), an element, which detects a change in pressure that is caused by driving member 26 when driving member 26 is tilted with knob 27, is employed as the displacement detecting element. Driving member 26 in FIG. 26(b) includes, for example, four detecting elements 51-54 for detecting changes of pressure caused by movement of driving member 26.

Figure 26C:
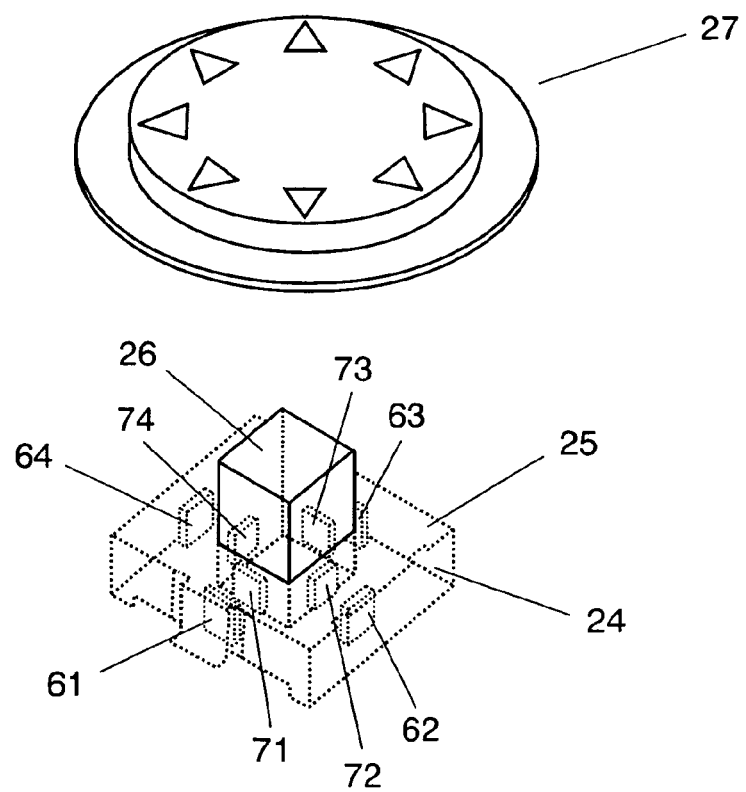
FIG. 26(c) is an exploded perspective view of the operation unit configured for detecting a magnetic field.

The displacement detecting element may even be, for example, a Hall element as shown in FIG. 26(c), In this case, for example, magnets 71-74 are attached to driving member 26, and the four Hall elements 61-64 detect a magnetic field, which changes as driving member 26 is moved.

Figure 26D:
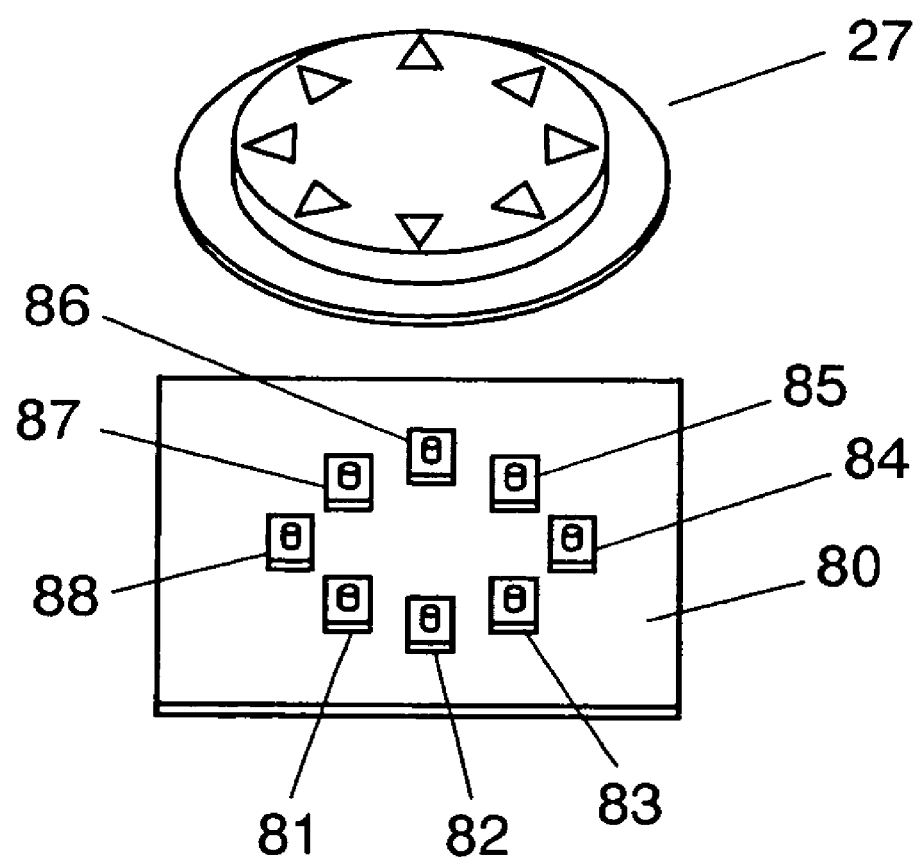
FIG. 26(d) is an exploded perspective view of the operation unit configured for detecting a change in pressure.
Figure 27A:
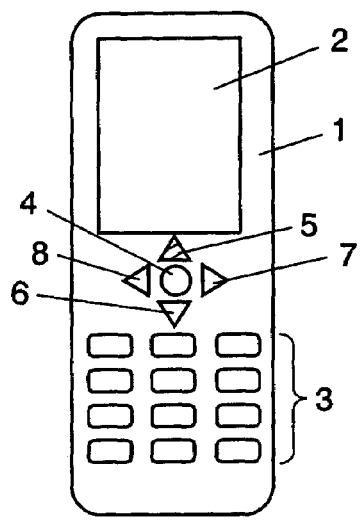
FIGS. 27(a) and 27(b) illustrate an input operation and a display screen of a conventional portable electronic apparatus, respectively.
Figure 27B:
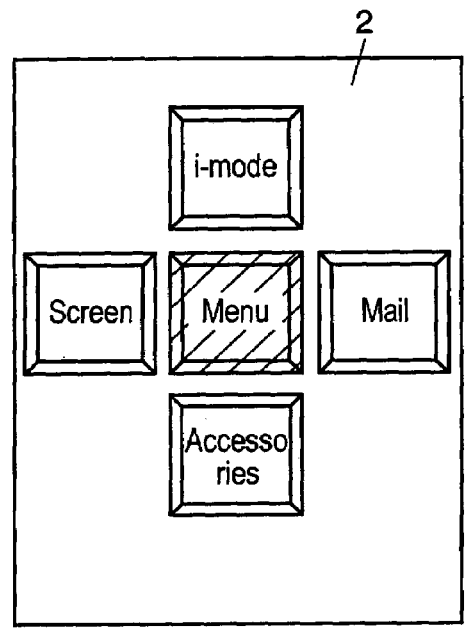
Figure 28A:
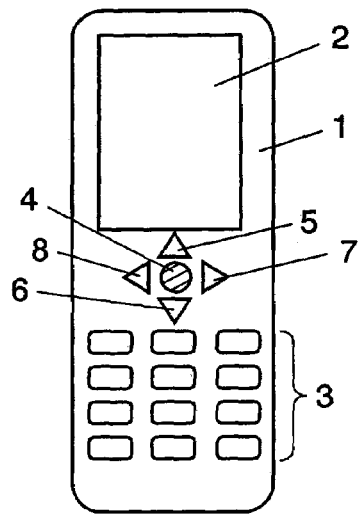
FIGS. 28(a) and 28(b) illustrate a conventional input operation and a conventional display screen, respectively.
Figure 28B:
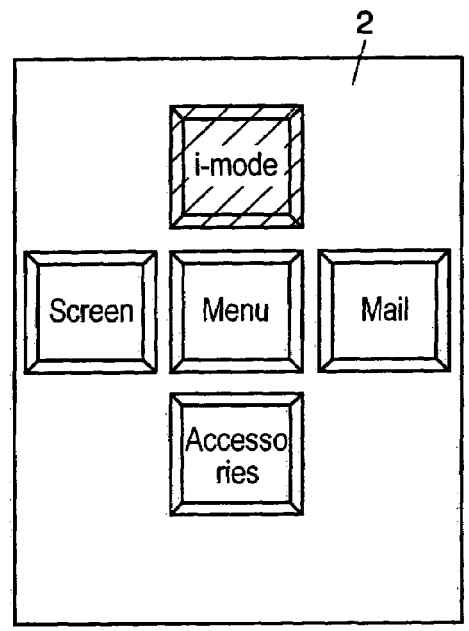
Figure 29A:
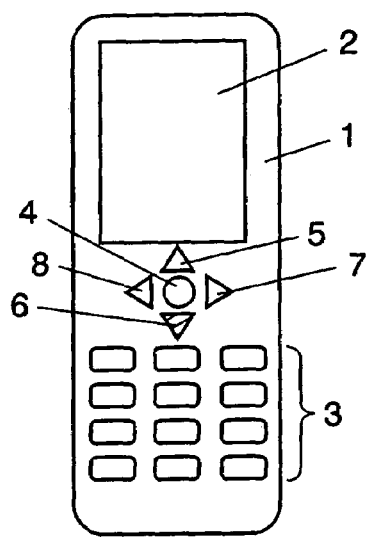
FIGS. 29(a) and 29(b) illustrate a conventional input operation and a conventional display screen, respectively.
Figure 29B:
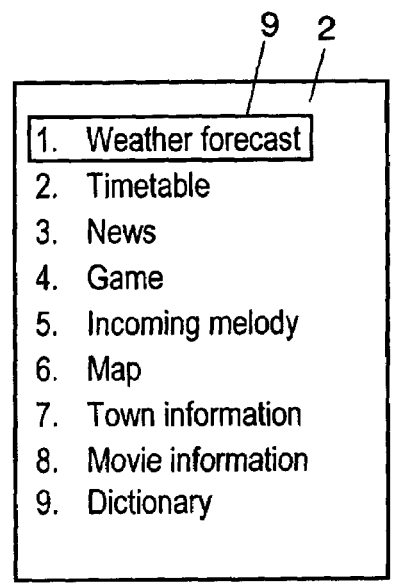
Figure 30A:
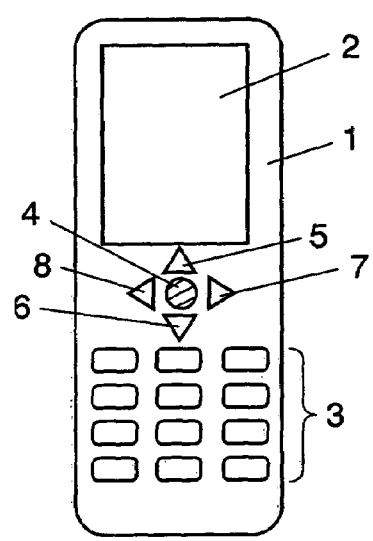
FIGS. 30(a) and 30(b) illustrate a conventional input operation and a conventional display screen, respectively.
Figure 30B:
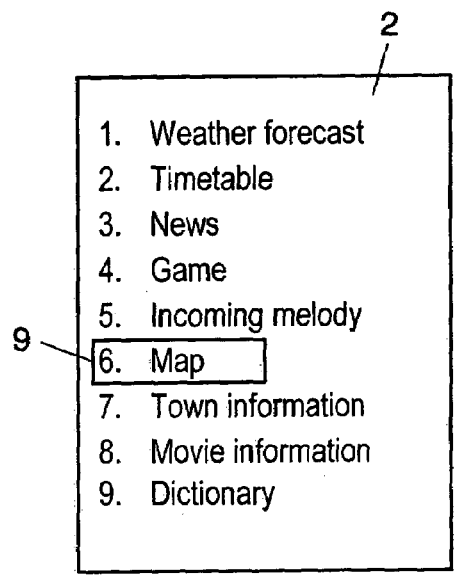
Figure 31A:
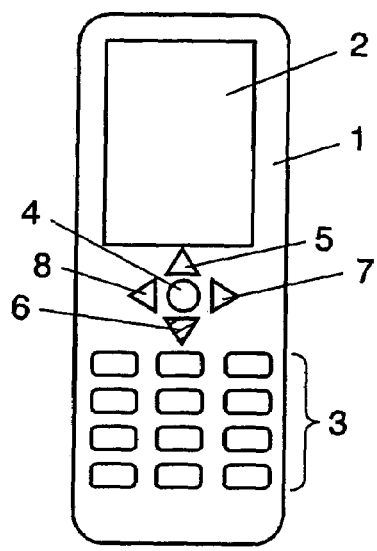
FIGS. 31(a) and 31(b) illustrate a conventional input operation and a conventional display screen, respectively.
Figure 31B:
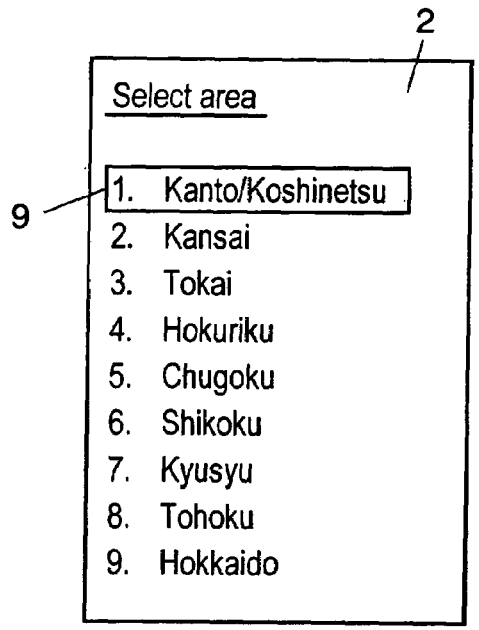
Figure 32A:
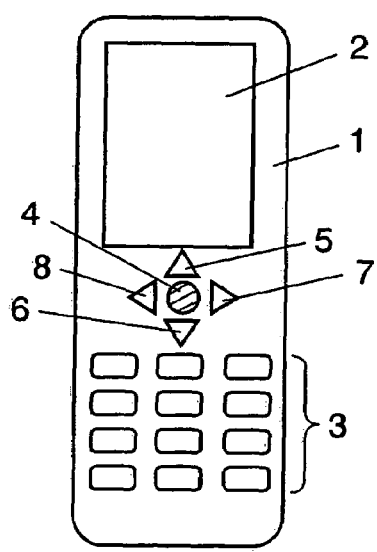
FIGS. 32(a) and 32(b) illustrate a conventional input operation and a conventional display screen, respectively.
Figure 32B:
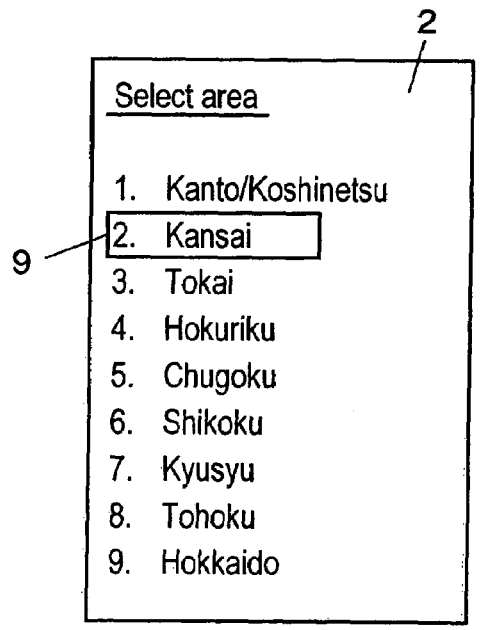
Figure 33A:
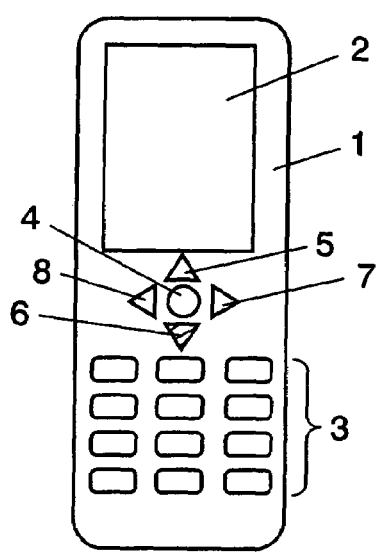
FIGS. 33(a) and 33(b) illustrate a conventional input operation and a conventional display screen, respectively.
Figure 33B:
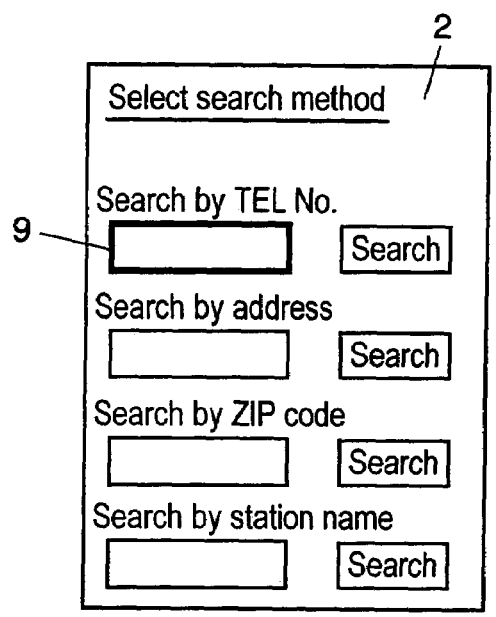
Figure 34A:
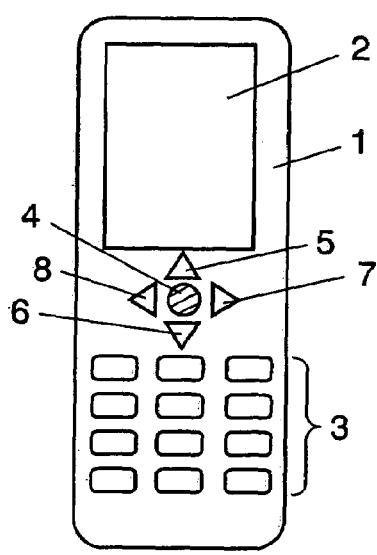
FIGS. 34(a) and 34(b) illustrate a conventional input operation and a conventional display screen, respectively.
Figure 34B:
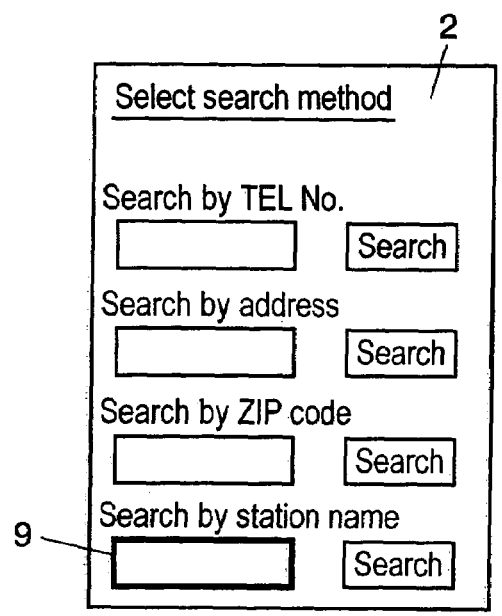
Figure 35A:
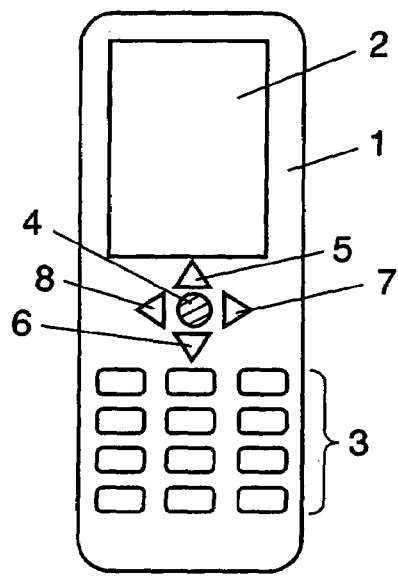
FIGS. 35(a) and 35(b) illustrate a conventional input operation and a conventional display screen, respectively.
Figure 35B:
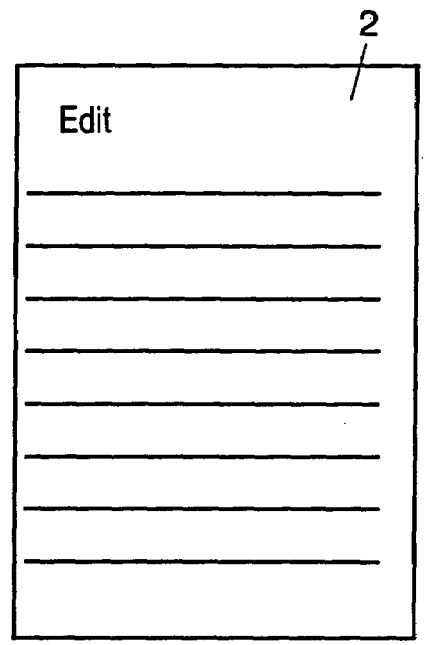
Figure 36A:
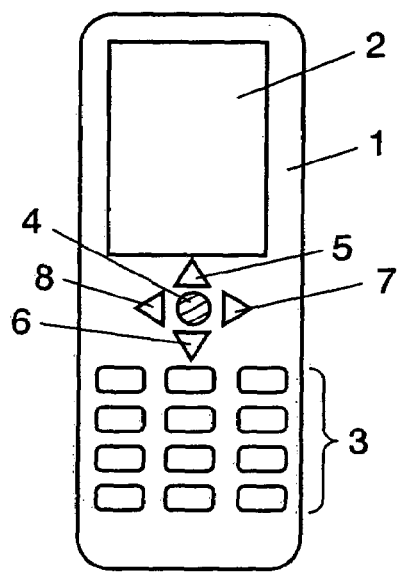
FIGS. 36(a) and 36(b) illustrate a conventional input operation and a conventional display screen, respectively.
Figure 36B:
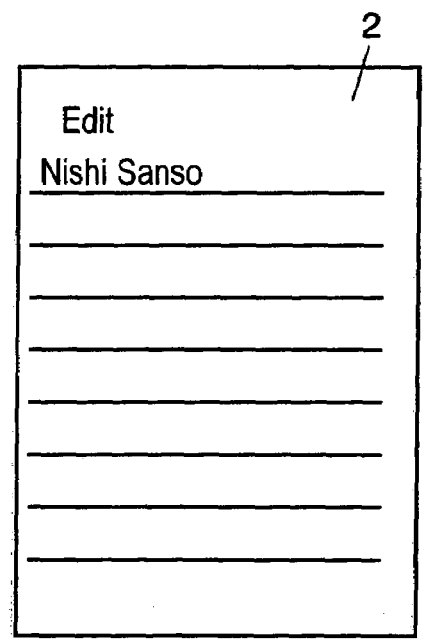
Figure 37A:
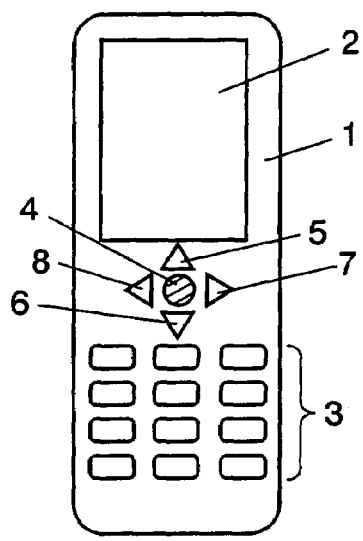
FIGS. 37(a) and 37(b) illustrate a conventional input operation and a conventional display screen, respectively.
Figure 37B:
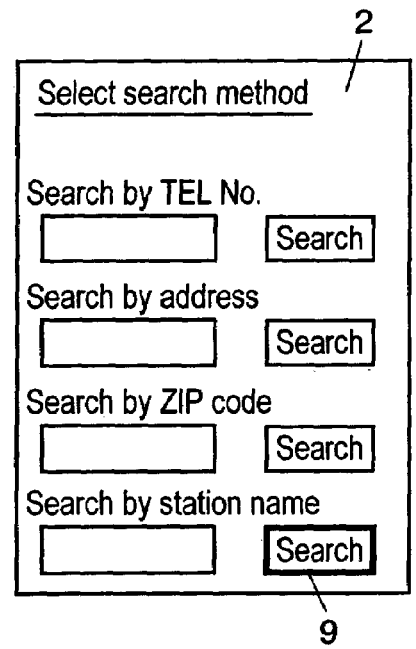
Figure 38A:
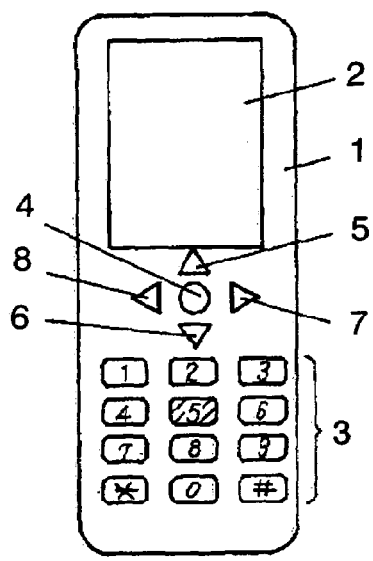
FIGS. 38(a) and 38(b) illustrate a conventional input operation and a conventional display screen, respectively.
Figure 38B:
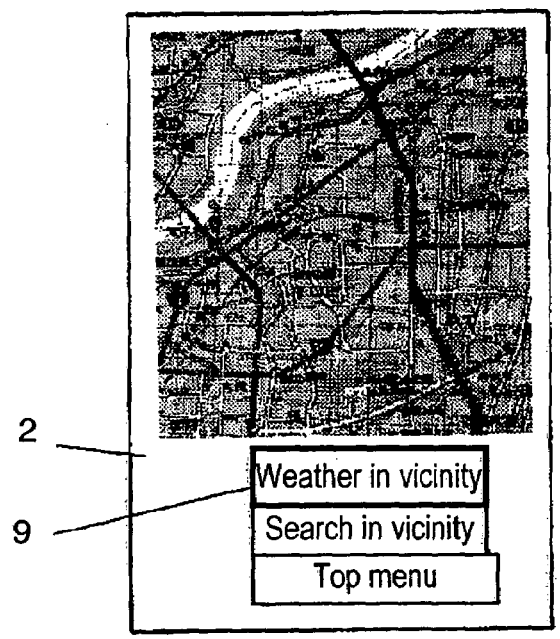
Figure 39A:
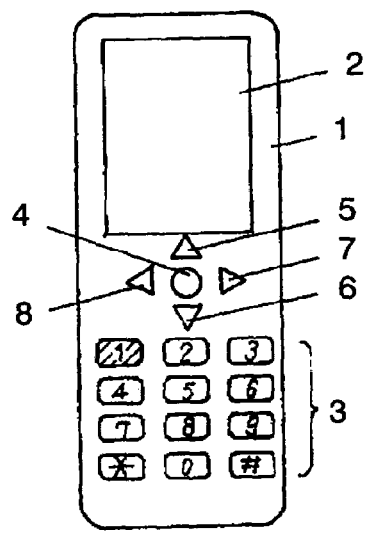
FIGS. 39(a) and 39(b) illustrate a conventional input operation and a conventional display screen, respectively.
Figure 39B:
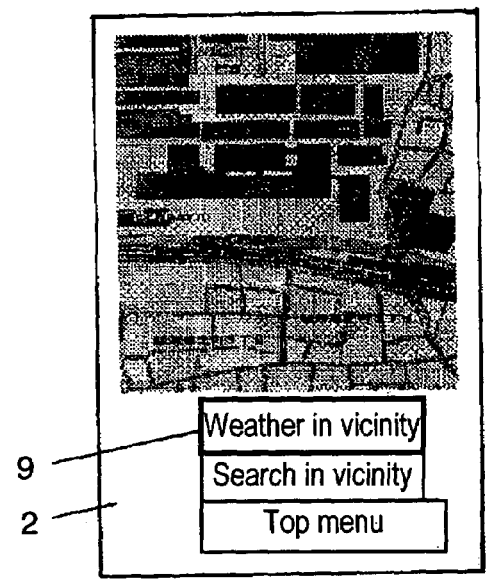
Figure 40A:
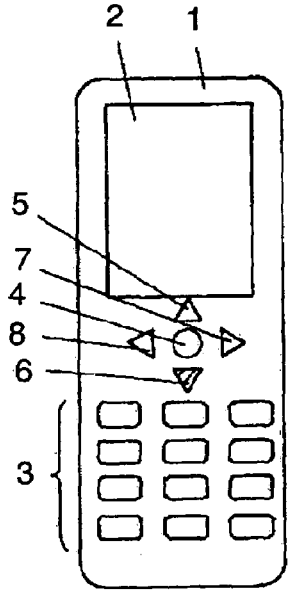
FIGS. 40(a)-40(b) illustrate conventional input operations and a conventional display screen.
Figure 40B:
Figure 40C:
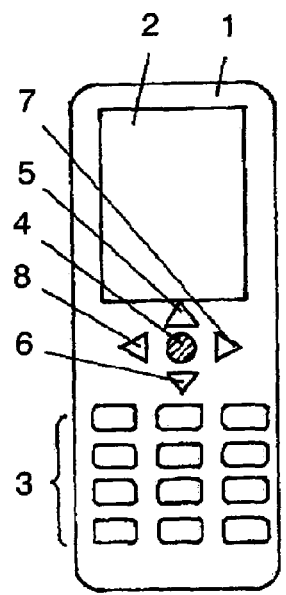
Figure 41:
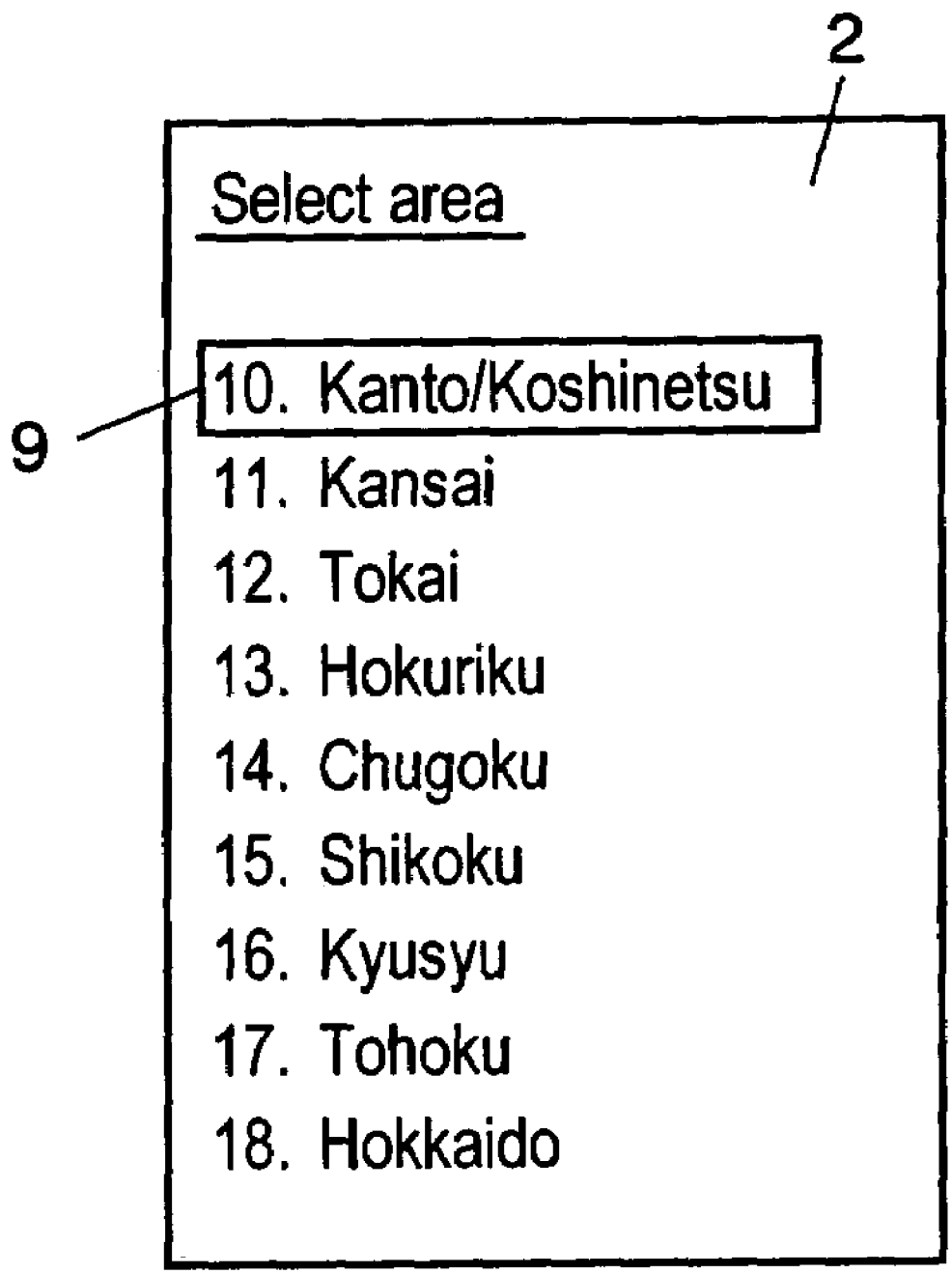
FIG. 41 illustrates a conventional display screen.

Instead of being the Hall element, as shown in FIG. 26(d), displacement detecting element 80 may be configured, for example, to include switches 81-88 corresponding to respective triangles of knob 27 that represent respective outward directions from a circle.

In the multidirectional input device using any one of such above-mentioned displacement detecting elements, the triangle of knob 27 that represents the direction is pressed to move pointer 19 or a cursor. Accordingly, pointer 19 or the cursor moves in that direction on the screen.

For the confirmation operation, a center portion of knob 27 is pressed. Accordingly, a push switch (not shown) disposed inside case 24 is switched on or off, whereby a signal indicative of the confirmation is generated.

In this way, the confirmation is performed with the push switch.

In the first embodiment, the ball is rolled along the plane for zooming in or out on the displayed image. The zoom in or out may be done in the second embodiment, for example, by allowing a user to move his/her finger clockwise or counterclockwise while pressing down knob 27. Accordingly, the direction indicative of the input using the multidirectional input device changes continuously. Control circuit 34 detects the continuous change of direction that lasts a short time and interprets this operation as the zoom in or out.

In the manner described above, the multidirectional input device undergoes such a rolling operation along the plane for zooming.

To zoom in or out, the user may move his/her finger from side to side or vertically while pressing down knob 27.

In each of these cases, the direction indicative of the input using the multidirectional input device undergoes a continuous change, which lasts a short time. The controller detects this change and interprets this operation as the zoom in or out.

In this way, the operation unit is operated in one direction for zooming in and in another direction for zooming out.

The portable electronic apparatus having such a structure has a usage pattern similar to that of the first embodiment mentioned earlier.

This portable electronic apparatus differs from that of the first embodiment particularly in that pointer 19 can be displayed and erased. Thus, the pointer can be erased when unnecessary, thereby affording a clear view of the display.

INDUSTRIAL APPLICABILITY

As described above, the portable electronic apparatus of the present invention is capable of operations, including zooming on the screen displayed on the display unit, scrolling, moving the cursor and selecting the icon, with one operation unit. These operations can be done without increasing finger movement from the operation unit. Accordingly, the user can focus his/her eyes on the display screen. In other words, this portable electronic apparatus has excellent operability.

By being mounted with this one operation unit, the portable electronic apparatus of the present invention can perform many functions. Thus, the portable electronic apparatus is easy to design.

The invention claimed is:

1. A portable electronic apparatus comprising:
   a display unit for displaying information received or stored;
   an operation unit used for operations including moving of a pointer displayed on the display unit, zooming and scrolling of the information displayed on the display unit, moving of a cursor and selection of an icon; and
   a controller for executing the operations in response to an operation of the operation unit,
   wherein the operation unit includes a multidirectional input device comprising a knob which itself does not rotate about an axis perpendicular to a surface of the portable electronic apparatus where the knob is provided, and
   the controller allows the zooming of the information to be performed when the knob is tilted with a clockwise or counterclockwise rotating motion along the surface of the portable electronic apparatus.

2. The portable electronic apparatus of claim 1, wherein the portable electronic apparatus includes a confirmation function following at least one of the operations including the zooming, the scrolling, the moving of the cursor and the selection of the icon.

3. The portable electronic apparatus of claim 2, wherein the multidirectional input device includes a push switch.

4. The portable electronic apparatus of claim 1, wherein the rotating operation performed on the knob in one direction of the rotating operation in the clockwise and counterclockwise direction corresponds to a zoom in of the information, and the operation performed on the operation unit in another direction of the rotating operation in the clockwise and counterclockwise direction corresponds to a zoom out of the information.

5. The portable electronic apparatus of claim 1, further comprising:
   another operation member for displaying and erasing the pointer displayed on the display unit.

6. The portable electronic apparatus of claim 1, wherein the scrolling of the information displayed on a screen of the display unit is performed by placing the pointer at an edge of the screen, and moving pointer along the edge.

7. The portable electronic apparatus of claim 1, wherein the zooming of the information displayed on a screen of the display unit is performed by placing the pointer at an edge of the screen, and moving pointer along the edge.

8. The portable electronic apparatus of claim 1, wherein the multidirectional input device includes a displacement detecting element coupled to the knob, and the displacement detecting element detects a direction of an input to the multidirectional input device.

9. The portable electronic apparatus of claim 1, wherein the displacement detecting element includes a plurality of switches respectively corresponding to directions to be detected.

* * * * *